US012607469B2

(12) United States Patent
Rolf et al.

(10) Patent No.: US 12,607,469 B2
(45) Date of Patent: Apr. 21, 2026

(54) METHOD, APPARATUS, AND COMPUTER PROGRAM PRODUCT FOR ESTIMATING A TIME-OF-ARRIVAL AT A DESTINATION

(71) Applicant: HERE Global B.V., Eindhoven (NL)

(72) Inventors: Daniel Rolf, Berlin (DE); Raul Cajias, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 234 days.

(21) Appl. No.: 17/117,957

(22) Filed: Dec. 10, 2020

(65) Prior Publication Data

US 2022/0034667 A1 Feb. 3, 2022

Related U.S. Application Data

(60) Provisional application No. 63/058,881, filed on Jul. 30, 2020.

(51) Int. Cl.
*G01C 21/34* (2006.01)
*G01C 21/36* (2006.01)
(52) U.S. Cl.
CPC ..... *G01C 21/3453* (2013.01); *G01C 21/3407* (2013.01); *G01C 21/36* (2013.01)
(58) Field of Classification Search
CPC G01C 21/3453; G01C 21/3407; G01C 21/36; G01C 21/3889; G01C 21/3446
See application file for complete search history.

(56) References Cited

U.S. PATENT DOCUMENTS

| | | | |
|---|---|---|---|
| 7,706,964 B2 | 4/2010 | Horvitz et al. | |
| 9,360,333 B2 | 6/2016 | Tuukkanen et al. | |
| 9,697,426 B2 | 7/2017 | Baselau et al. | |
| 10,816,351 B1 * | 10/2020 | Yao ..................... | G01C 21/3484 |
| 2010/0217519 A1 * | 8/2010 | Englerth ............ | G01C 21/3492 |
| | | | 701/465 |
| 2013/0204525 A1 * | 8/2013 | Pfeifle ................ | G01C 21/3469 |
| | | | 701/400 |
| 2014/0088871 A1 * | 3/2014 | Gueziec ................. | G01C 21/30 |
| | | | 701/533 |

(Continued)

OTHER PUBLICATIONS

Wang et al., *Travel Time Estimation of a Path Using Sparse Trajectories*, Zhejiang University and Cornell University (10 pages).

*Primary Examiner* — Abdalla A Khaled
(74) *Attorney, Agent, or Firm* — ALSTON & BIRD LLP

(57) ABSTRACT

Provided herein is a method of estimating a travel time along a route. Methods may include: obtaining a route between an origin and a destination, where the route includes a plurality of road links; identifying a subset of road links of the plurality of road links; providing an identification of each road link of the subset of road links to a service provider; receiving an indication of a pace of travel along each of the subset of road links; computing an estimated travel time along the route based on the pace of travel along each of the subset of road links; and providing an estimated time-of-arrival at the destination based on an identified departure time and the estimated travel time along the route. Methods may include computing an estimated travel time error along the route, and providing the estimated travel time error as a potential error of the estimated time-of-arrival.

19 Claims, 5 Drawing Sheets

(56) References Cited

U.S. PATENT DOCUMENTS

| | | | |
|---|---|---|---|
| 2014/0089250 A1* | 3/2014 | Chatterjee | G06Q 50/40 |
| | | | 706/52 |
| 2014/0288821 A1* | 9/2014 | Modica | G08G 1/127 |
| | | | 701/465 |
| 2015/0046083 A1* | 2/2015 | Maitra | G08G 1/123 |
| | | | 701/465 |
| 2017/0052036 A1* | 2/2017 | Uno | G01C 21/3492 |
| 2017/0314950 A1* | 11/2017 | Tian | G06F 21/6218 |
| 2018/0209808 A1* | 7/2018 | Wang | G06F 18/214 |
| 2018/0259345 A1* | 9/2018 | Wang | G06Q 50/40 |
| 2018/0321047 A1* | 11/2018 | Sagawa | H04L 67/34 |
| 2018/0357736 A1* | 12/2018 | Sun | G06N 3/09 |
| 2019/0063939 A1* | 2/2019 | Chai | G06F 16/29 |
| 2019/0390969 A1* | 12/2019 | Lermusiaux | G01C 21/203 |
| 2020/0011692 A1* | 1/2020 | Sun | G08G 1/0129 |
| 2020/0284594 A1* | 9/2020 | Wang | G08G 1/0112 |
| 2020/0393262 A1* | 12/2020 | Liu | G06V 20/54 |
| 2021/0088349 A1* | 3/2021 | Li | G08G 1/052 |
| 2021/0172758 A1* | 6/2021 | John | G01C 21/3667 |
| 2021/0180972 A1* | 6/2021 | Sanin Riano | G06N 20/00 |

* cited by examiner

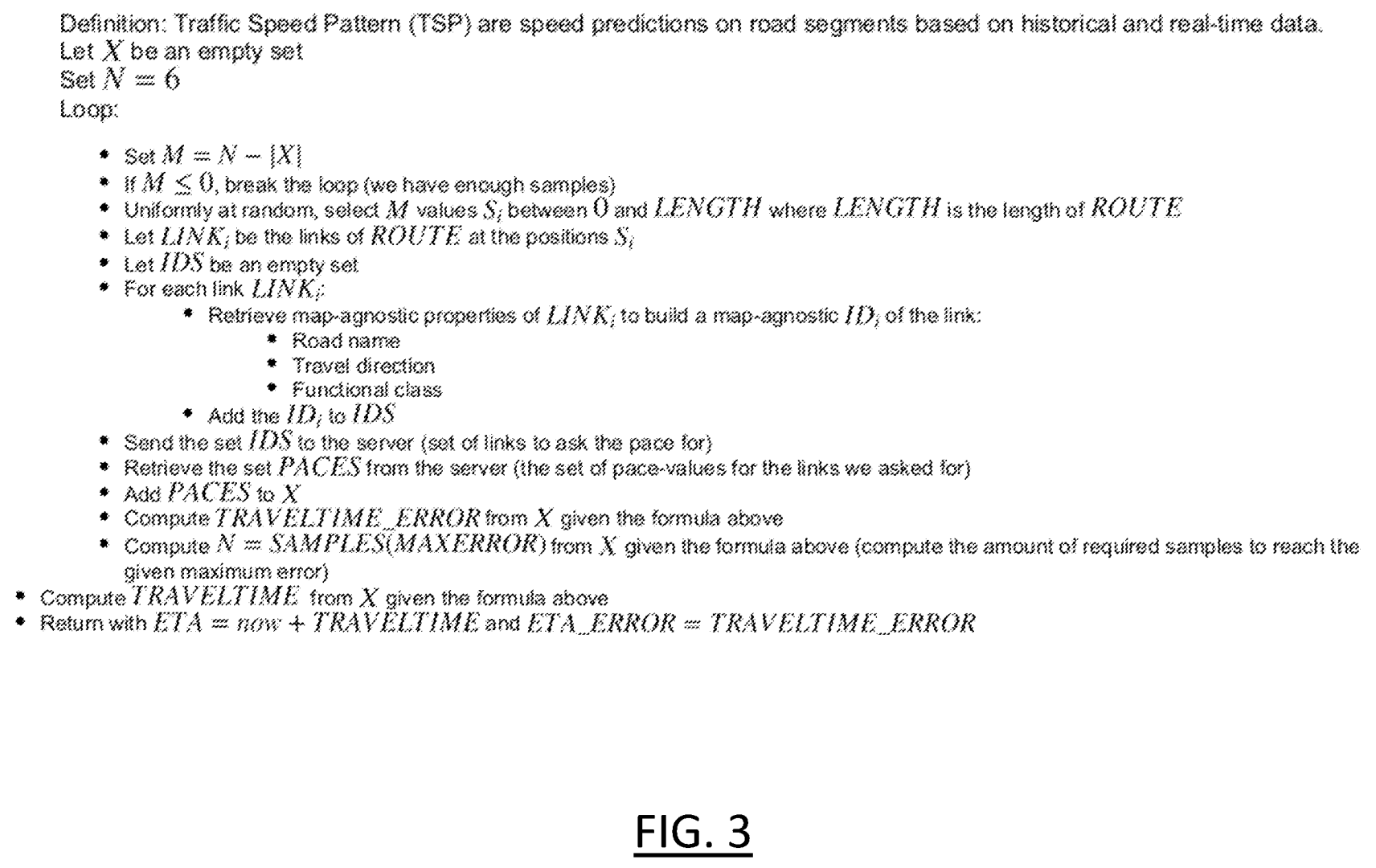

Definition: Traffic Speed Pattern (TSP) are speed predictions on road segments based on historical and real-time data.

Let $X$ be an empty set

Set $N = 6$

Loop:

- Set $M = N - |X|$
- If $M \leq 0$, break the loop (we have enough samples)
- Uniformly at random, select $M$ values $S_i$ between 0 and $LENGTH$ where $LENGTH$ is the length of $ROUTE$
- Let $LINK_i$ be the links of $ROUTE$ at the positions $S_i$
- Let $IDS$ be an empty set
- For each link $LINK_i$:
  - Retrieve map-agnostic properties of $LINK_i$ to build a map-agnostic $ID_i$ of the link:
    - ∗ Road name
    - ∗ Travel direction
    - ∗ Functional class
  - Add the $ID_i$ to $IDS$
- Send the set $IDS$ to the server (set of links to ask the pace for)
- Retrieve the set $PACES$ from the server (the set of pace-values for the links we asked for)
- Add $PACES$ to $X$
- Compute $TRAVELTIME\_ERROR$ from $X$ given the formula above
- Compute $N = SAMPLES(MAXERROR)$ from $X$ given the formula above (compute the amount of required samples to reach the given maximum error)

- Compute $TRAVELTIME$ from $X$ given the formula above
- Return with $ETA = now + TRAVELTIME$ and $ETA\_ERROR = TRAVELTIME\_ERROR$

FIG. 3

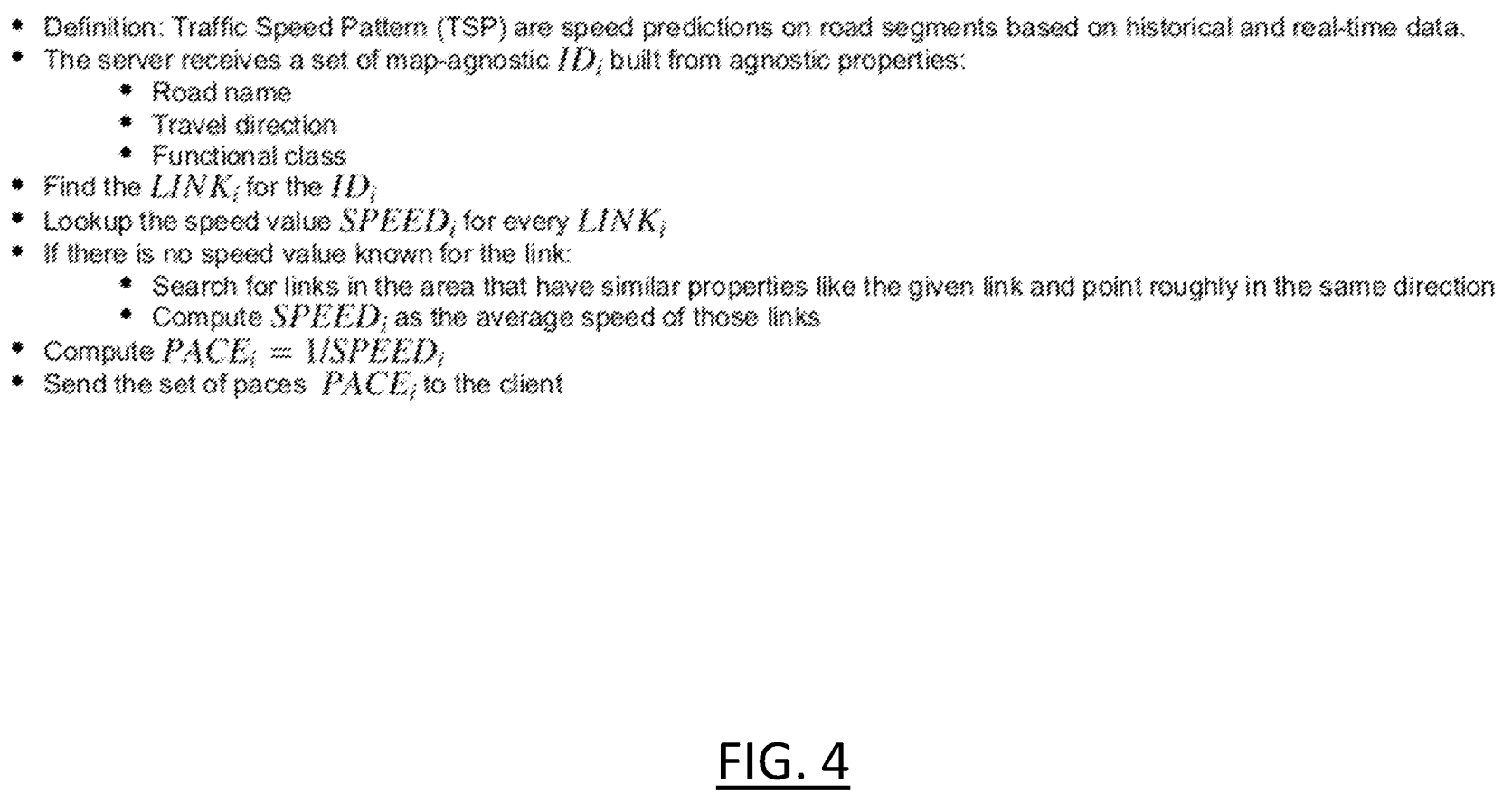

- Definition: Traffic Speed Pattern (TSP) are speed predictions on road segments based on historical and real-time data.
- The server receives a set of map-agnostic $ID_j$ built from agnostic properties:
  - Road name
  - Travel direction
  - Functional class
- Find the $LINK_i$ for the $ID_j$
- Lookup the speed value $SPEED_i$ for every $LINK_i$
- If there is no speed value known for the link:
  - Search for links in the area that have similar properties like the given link and point roughly in the same direction
  - Compute $SPEED_i$ as the average speed of those links
- Compute $PACE_i = 1/SPEED_i$
- Send the set of paces $PACE_j$ to the client

FIG. 4

METHOD, APPARATUS, AND COMPUTER PROGRAM PRODUCT FOR ESTIMATING A TIME-OF-ARRIVAL AT A DESTINATION

CROSS-REFERENCE TO RELATED APPLICATIONS

This application claims priority to U.S. Provisional Patent Application Ser. No. 63,058,881, filed on Jul. 30, 2020, the contents of which are hereby incorporated by reference in their entirety.

TECHNOLOGICAL FIELD

Embodiments described herein generally relate to requesting and receiving an estimated time-of-arrival at a destination, and more particularly, estimating a travel time along a route by requesting a pace of travel along a subset of road links of the route to a destination and using a received pace of travel along the subset of road links to estimate a time-of-arrival at the destination.

BACKGROUND

Historically paper-based maps were periodically updated in terms of months, years, or longer to account for changes to road infrastructure. Map updates required substantial manual effort and printing of new maps based on the anticipated need. Paper maps have given way to digital maps which can be updated considerably more regularly, and can be of substantially greater detail including all manner of features from roadways to points-of-interest or other features that can be geo-located.

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision-making.

Data received from infrastructure monitoring systems and crowd-sourced data has become ubiquitous and may be available for facilitating route guidance and navigation system information. However, this data can be mined to provide various other services to users and to grow the availability of navigational assistance and route planning.

BRIEF SUMMARY

A method, apparatus, and computer program product are provided in accordance with an example embodiment for, requesting a pace of travel along a subset of road links of a route to a destination and using a received pace of travel along the subset of road links to estimate a time-of-arrival at the destination using map format agnostic road links and using reduced bandwidth. Embodiments provided herein may include an apparatus having at least one processor and at least one memory including computer program code, the at least one memory and computer program code configured to, with the processor, cause the apparatus to at least: obtain a route between an origin and a destination, where the route includes a plurality of sequential road links; identify a subset of road links of the plurality of sequential road links; provide an identification of each road link of the subset of road links to a service provider; receive an indication of a pace of travel along each of the subset of road links; compute an estimated travel time along the route based on the pace of travel along each of the subset of road links; and provide an estimated time-of-arrival at the destination based on an identified departure time and the estimated travel time along the route.

According to an example embodiment, the apparatus may be caused to: compute an estimated travel time error along the route; and provide the estimated travel time error as a potential error of the estimated time-of-arrival. Causing the apparatus of some embodiments to compute an estimated travel time error along the route may include causing the apparatus to: determine a variance of pace of travel for the subset of road links; and divide the variance of pace of travel by a square root of a number of road links in the subset of road links to obtain the estimated travel time error along the route. The subset of road links of the plurality of road links may be a first subset of road links, where in response to the estimated travel time error along the route being greater than a predefined maximum error, the apparatus may be caused to: identify a second subset of road links of the plurality of sequential road links, where the second subset of road links includes more road links than the first subset of road links; provide an identification of each road link of the second subset of road links to the service provider; receive an indication of a pace of travel along each of the second subset of road links; and compute an estimated travel time error along the route from the second subset of road links, where causing the apparatus to provide an estimated time-of-arrival at the destination based on an identified departure time and the estimated travel time along the route includes causing the apparatus to provide an estimated time-of-arrival at the destination based on an identified departure time and the estimated travel time along the route in response to the estimated travel time error along the route from the second subset of road links being below the predefined maximum error.

According to some embodiments, causing the apparatus to identify a subset of road links of the plurality of sequential road links includes causing the apparatus to: select a predefined number of positions along the route; and identify a road link associated with each of the predefined number of positions along the route, where the road links associated with the predefined number of positions along the route includes the subset of road links of the plurality of sequential road links. Causing the apparatus to provide an identification of each road link of the subset of road links to the service provider may include causing the apparatus to: retrieve map version agnostic properties of each road link of the subset of road links; and provide the map version agnostic properties of each road link of the subset of road links to the service provider for identification of the subset of road links. The map version agnostic properties of each road link include two or more of: a referencing scheme, state route number, federal highway number, interstate number, longitude and latitude of a reference point of a road link, road link bearing, roadway functional class, and road name. The apparatus of an example embodiment may be caused to: identify a new subset of road links from remaining sequential road links of the route periodically as the route is traversed; provide an identification of each road link of the new subset of road links to the service provider; receive an indication of a pace of travel along each of the new subset of road links; compute a revised estimated travel time along the route based on the pace of travel along each of the new subset of road links; and provide a revised estimated time-of-arrival at the destination based on the revised estimated travel time along the route.

Embodiments provided herein may include a computer program product having at least one non-transitory computer-readable storage medium having computer-executable program code portions stored therein, the computer-executable program code portions including program code instructions configured to: obtain a route between an origin and a destination, where the route includes a plurality of sequential road links; identify a subset of road links of the plurality of sequential road links; provide an identification of each road link of the subset of road links to a service provider; receive an indication of a pace of travel along each of the subset of road links; compute an estimated travel time along the route based on the pace of travel along each of the subset of road links; and provide an estimated time-of-arrival at the destination based on an identified departure time and the estimated travel time along the route. Embodiments may include program code instructions to: compute an estimated travel time along the route; and provide the estimated travel time error as a potential error of the estimated time-of-arrival.

According to an example embodiment, the program code instructions to compute an estimated travel time error along the route include program code instructions to: determine a variance of pace of travel for the subset of road links; and divide the variance of pace of travel by a square root of a number of road links in the subset of road links to obtain the estimated travel time error along the route. The first subset of road links of the plurality of road links may be a first subset of road links, where in response to the estimated travel time error along the route being greater than a predefined maximum error, the computer program product may include program code instructions to: identify a second subset of road links of the plurality of sequential road links, where the second subset of road links includes more road links than the first subset of road links; provide an identification of each road link of the second subset of road links to the service provider; receive an indication of a pace of travel along each of the second subset of road links; and compute an estimated travel time error along the route from the second subset of road links, where the program code instructions to provide an estimated time-of-arrival at the destination based on an identified departure time and the estimated travel time along the route includes program code instructions to: provide an estimated time-of-arrival at the destination based on an identified departure time and the estimated travel time along the route in response to the estimated travel time error along the route from the second subset of road links being below the predefined maximum error.

The program code instructions to identify a subset of road links of the plurality of sequential road links may include program code instructions to: select a predefined number of positions along the route; and identify a road link associated with each of the predefined number of positions along the route, where the road links associated with the predefined number of positions along the route include the subset of road links of the plurality of sequential road links. The program code instructions to provide an identification of each road link of the subset of road links to the service provider may include program code instructions to: retrieve map version agnostic properties of each road link of the subset of road links; and provide the map version agnostic properties of each road link of the subset of road links to the service provider for identification of the subset of road links.

The map version agnostic properties of each road link may include two or more of: a referencing scheme, state route number, federal highway number, interstate number, direction of travel, latitude and longitude of a reference point of a road link, road link bearing, roadway functional class, and road name. Embodiments may include program code instructions to: identify a new subset of road links from remaining sequential road links of the route periodically as the route is traversed; provide an identification of each road link of the new subset of road links to the service provider; receive an indication of a pace of travel along each of the new subset of road links; compute a revised estimated travel time along the route based on the pace of travel along each of the new subset of road links; and provide a revised estimated time-of-arrival at the destination based on the revised estimated travel time along the route.

Embodiments provided herein include a method including: obtaining a route between an origin and a destination, where the route includes a plurality of sequential road links; identifying a subset of road links of the plurality of sequential road links; providing an identification of each road link of the subset of road links to a service provider; receiving an indication of a pace of travel along each of the subset of road links; computing an estimated travel time along the route based on the pace of travel along each of the subset of road links; and providing an estimated time-of-arrival at the destination based on an identified departure time and the estimated travel time along the route. Methods may include computing an estimated travel time error along the route, and providing the estimated travel time error as a potential error of the estimated time-of-arrival.

According to an example embodiment, computing an estimated travel time error along the route includes: determining a variance of pace of travel for the subset of road links; and dividing the variance of pace of travel by a square root of a number of road links in the subset of road links to obtain the estimated travel time error along the route. The subset of road links of the plurality of road links may be a first subset of road links, where in response to the estimated travel time error along the route being greater than a predefined maximum error, the method may further include: identifying a second subset of road links of the plurality of sequential road links, where the second subset of road links includes more road links than the first subset of road links; providing an identification of each road link of the second subset of road links to the service provider; receiving an indication of a pace of travel along each of the second subset of road links; and computing an estimated travel time error along the route from the second subset of road links, where providing an estimated time-of-arrival at the destination based on an identified departure time and the estimated travel time along the route may include: providing an estimated time-of-arrival at the destination based on an identified departure time and the estimated travel time along the route in response to the estimated travel time error along the route from the second subset of road links being below the predefined maximum error.

Embodiments provided herein include an apparatus including: means for obtaining a route between an origin and a destination, where the route includes a plurality of sequential road links; means for identifying a subset of road links of the plurality of sequential road links; means for providing an identification of each road link of the subset of road links to a service provider; means for receiving an indication of a pace of travel along each of the subset of road links; means for computing an estimated travel time along the route based on the pace of travel along each of the subset of road links;

and means for providing an estimated time-of-arrival at the destination based on an identified departure time and the estimated travel time along the route. An apparatus of example embodiments may include means for computing an estimated travel time error along the route, and means for providing the estimated travel time error as a potential error of the estimated time-of-arrival.

According to an example embodiment, the means for computing an estimated travel time error along the route includes: means for determining a variance of pace of travel for the subset of road links; and means for dividing the variance of pace of travel by a square root of a number of road links in the subset of road links to obtain the estimated travel time error along the route. The subset of road links of the plurality of road links may be a first subset of road links, where in response to the estimated travel time error along the route being greater than a predefined maximum error, the apparatus may further include: means for identifying a second subset of road links of the plurality of sequential road links, where the second subset of road links includes more road links than the first subset of road links; means for providing an identification of each road link of the second subset of road links to the service provider; means for receiving an indication of a pace of travel along each of the second subset of road links; and means for computing an estimated travel time error along the route from the second subset of road links, where the means for providing an estimated time-of-arrival at the destination based on an identified departure time and the estimated travel time along the route may include: means for providing an estimated time-of-arrival at the destination based on an identified departure time and the estimated travel time along the route in response to the estimated travel time error along the route from the second subset of road links being below the predefined maximum error.

BRIEF DESCRIPTION OF THE DRAWINGS

Figure 1:
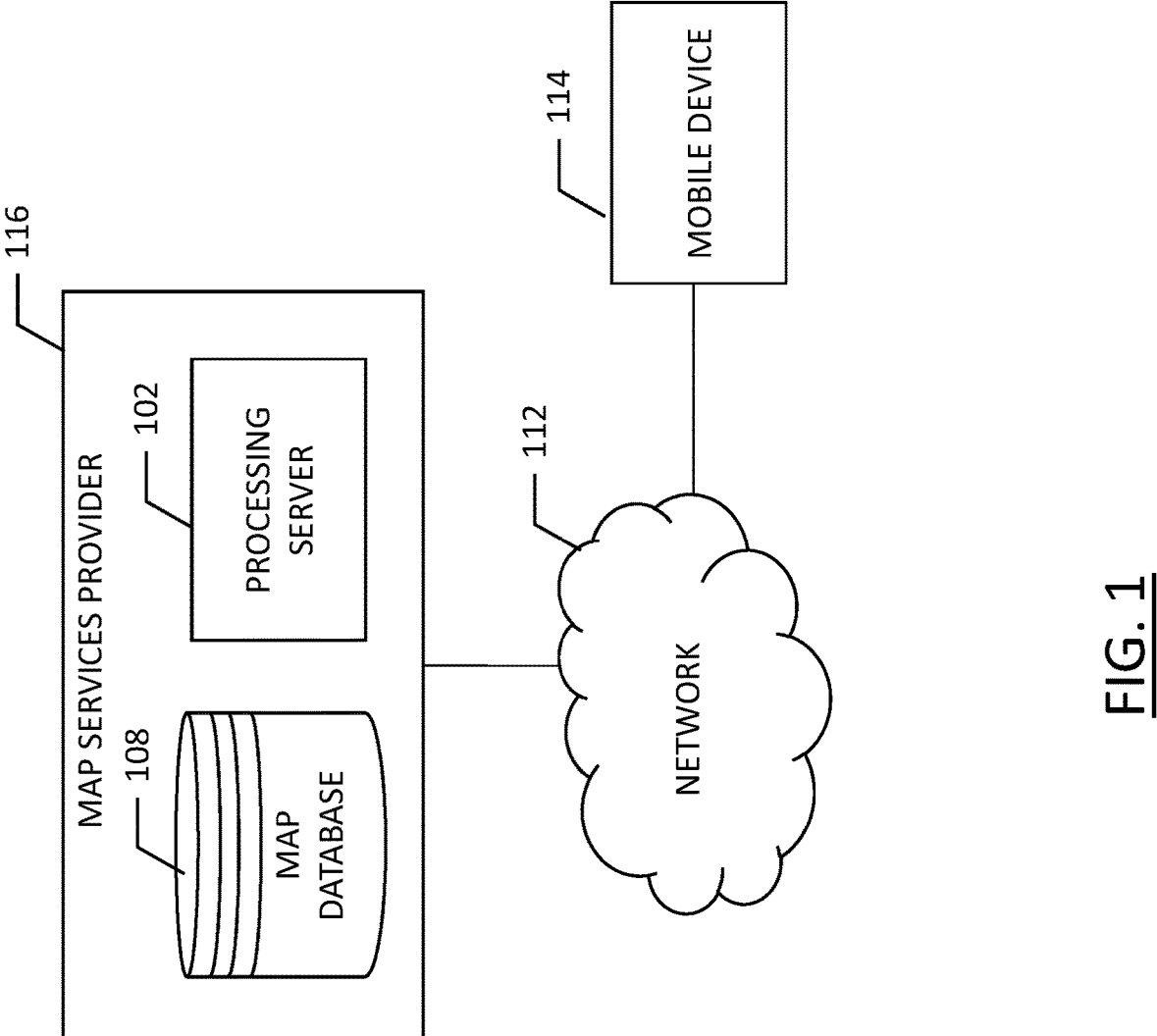
Figure 2:
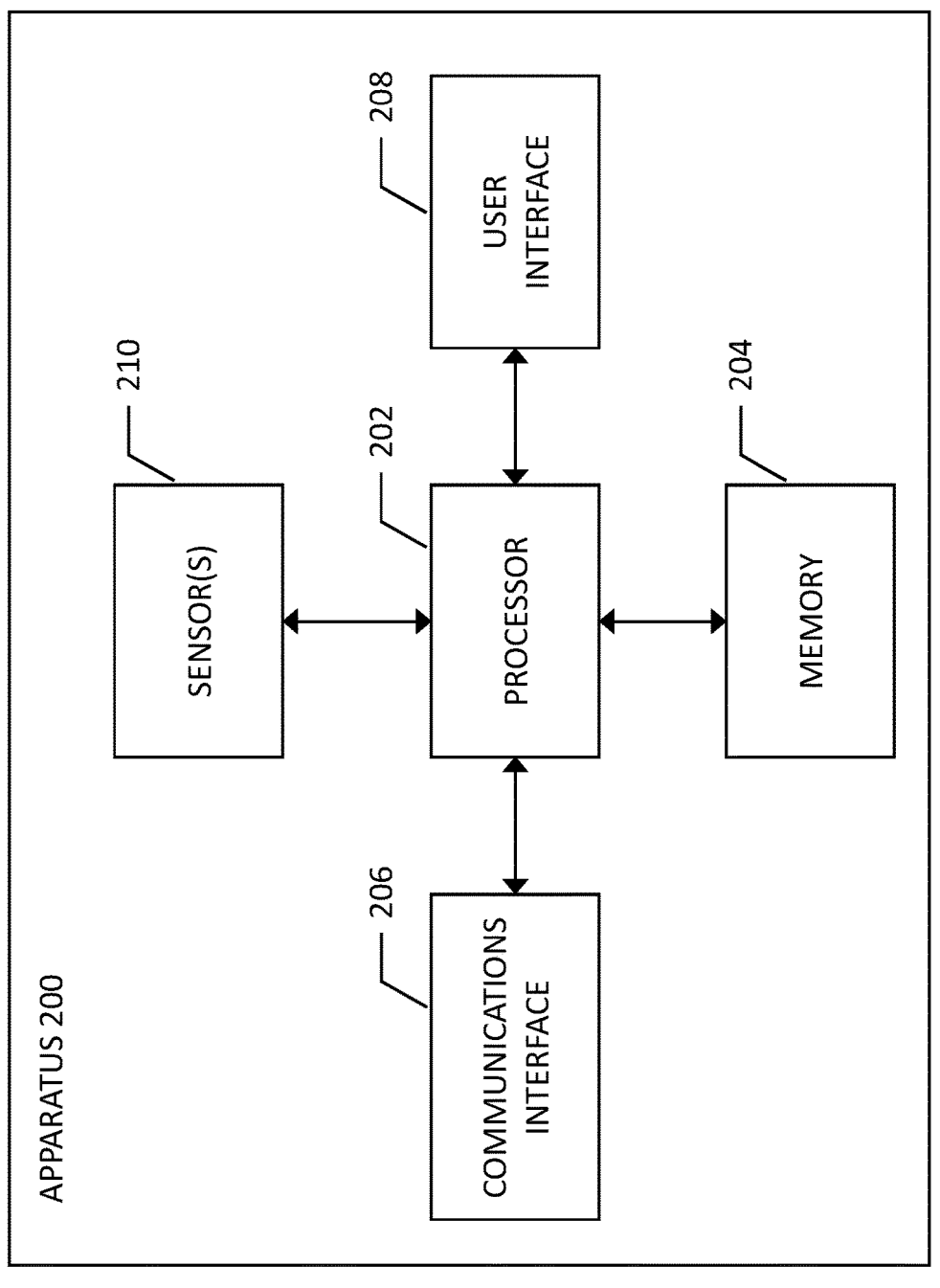
Figure 5:
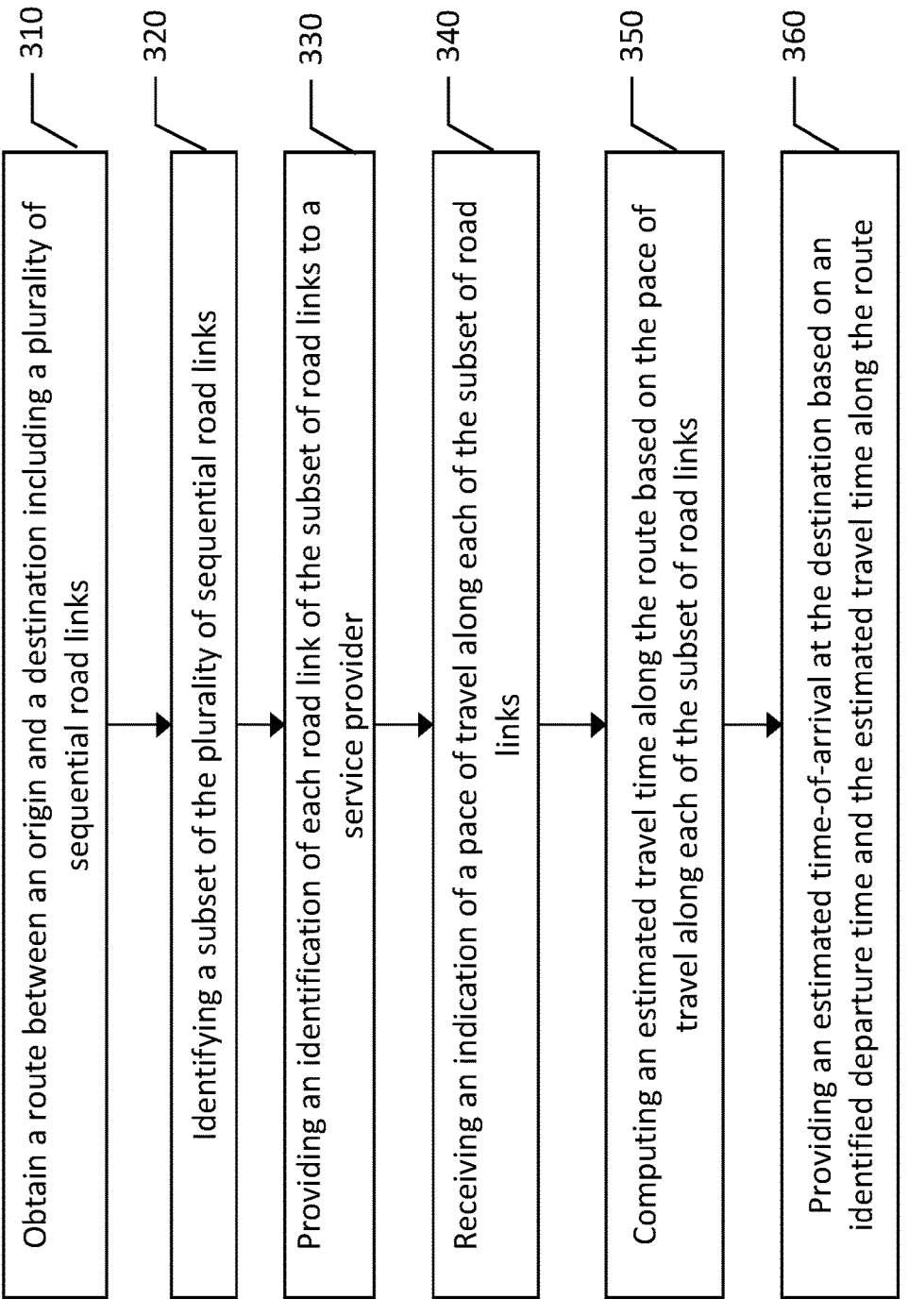

Having thus described example embodiments of the invention in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for estimating a time-of-arrival and a travel time error in a manner requiring lower-bandwidth and low processing capacity in accordance with an example embodiment of the present disclosure;

FIG. 3 illustrates an example algorithm to estimate a travel time for a route according to an example embodiment of the present disclosure;

FIG. 4 illustrates a server-side processing of the pace values request according to an example embodiment of the present disclosure; and FIG. 5 is a flowchart of a method for estimating a time-of-arrival and a travel time error in a manner requiring lower-bandwidth and low processing capacity in accordance with an example embodiment of the present disclosure.

DETAILED DESCRIPTION

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus, and computer program product are provided herein in accordance with an example embodiment for requesting and receiving an estimated time-of-arrival at a destination, and more particularly, requesting a pace of travel along a subset of road links of a route to a destination and using a received pace of travel along the subset of road links to estimate a time-of-arrival at the destination using map format agnostic road links and requiring reduced bandwidth relative to conventional methods. Embodiments described herein are uniquely capable of estimating the time-of-arrival at a destination while using a subset of road links to represent the entire route to the destination to reduce processing and bandwidth requirements. Embodiments further use map format agnostic road links capable of identifying map elements that may have changed between map versions and ensuring proper correlation between old map elements and revised map elements in the event that maps and map versions do not have compatible road segment identifiers or other incompatibilities that may otherwise inhibit conventional route communication and navigation. Further, embodiments enable communication of the route using a lower bandwidth to reduce the amount of data transmitted between the client and the server, thereby improving the efficiency of the calculation of an estimated time-of-arrival.

FIG. 1 illustrates a communication diagram of an example embodiment of a system for implementing example embodiments described herein. The illustrated embodiment of FIG. 1 includes a map services provider system 116, a processing server 102 in data communication a geographic map database, e.g., map database 108 through a network 112, and one or more mobile devices 114. The mobile device 114 may be associated, coupled, or otherwise integrated with a vehicle, such as an in-dash vehicle navigation unit, a vehicle head unit, an electronic control unit, or an advanced driver assistance system (ADAS), or a controller that facilitates autonomous or semi-autonomous driving, for example. Additional, different, or fewer components may be provided. For example, many mobile devices 114 may connect with the network 112. The map services provider 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

Processing server 102 may be one or more fixed or mobile computing devices. The mobile device 114 may be configured to access the map database 108 via the processing server 102 through, for example, a mapping application, such that the user equipment may provide navigational assistance to a user among other services provided through access to the map services provider 116.

The map database 108 may include node data, road segment/link data, point of interest (POI) data, or the like. The map database 108 may also include cartographic data, routing data, and/or maneuvering data. According to some example embodiments, the road segment/link data records may be links or segments representing roads, streets, or paths, as may be used in calculating a route or recorded route information for determination of one or more personalized routes. The links or roadways may be represented by polylines, where each polyline comprises a plurality of vertices establishing the path of the roadway geometry. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road links/segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider, and may be periodically updated based on new roads, re-routing of existing roads, changes in points-of-interest, etc. By way of example, the map services provider can collect geographic data to generate and enhance the map database 108. According to some embodiments, the map database 108 may delegate map generation and revision to other devices, such as mobile device 114. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Also, remote sensing, such as aerial or satellite photography, can be used to generate map geometries directly or through machine learning as described herein. The map data gathered from among various sources may be compiled into map updates that may take place periodically or as needed, resulting in a dynamic map database 108 that is routinely changed and updated to reflect the most accurate representation of the roads and features of a region.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map services provider. For example, a customer of the map services provider, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example. Optionally, a portion of the map database 108, such as map data regarding a specific roadway, may be downloaded or stored temporarily on an end user device, and according to various embodiments described herein, the mobile device 114 may be configured to modify the map data regarding a roadway before sending the map data back to the map database 108.

According to some embodiments, a server side map database 108 and a client side map database may be different. For example, even when the map data of both map databases is from the same map services provider 116, the map data may differ from server side to client side. This may be due to different map versions existing and being updated at different periodic rates. Further, client map data and server map data may differ when the map data originates from different sources. Different map data and map versions between a client and a server may be problematic when routing services are required by the mobile device 114 and provided by the map services provider 116. Road links that are identified by unique identifiers in a server side map database 108 may be incompatible with identifiers or road links of a client side map database. As such, embodiments provided herein use an identifier-independent protocol to provide a server side generated route to a client.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. A mobile device is provided for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The processing server 102 may receive probe data from a mobile device 114 or a device in communication with mobile device 114. The mobile device 114 may include one or more detectors or sensors as a positioning system built or embedded into or within the mobile device 114. Alternatively, the mobile device 114 uses communications signals for position determination. The mobile device 114 may receive location data from a global navigation satellite system (GNSS) such as Global Positioning System (GPS), GALILEO, BeiDou, GLONASS or the like, cellular tower location methods, access point communication fingerprinting, or the like. The server 102 may receive sensor data configured to describe a position of a mobile device, or a processor of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal and longitudinal position, and/or height, GPS coordinates, wireless network positioning, such as Wi-Fi Bluetooth™ positioning, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like. Probe data collected by a mobile device 114 may be error prone, where probe data location information may not correspond precisely with the actual physical location of the probe. For example, probes traveling through urban canyons, forests, or actual canyons may have probe data point locations that are very noisy in that they do not correspond well with the actual location of the probe due to signal noise and issues with positioning means for detecting the location of the probe.

An example embodiment of a mobile device 114 may be embodied in an apparatus as illustrated in FIG. 2. The apparatus 200, such as that shown in FIG. 2, may be specifically configured in accordance with an example embodiment of the present disclosure for establishing an estimated time-of-arrival at a destination. The apparatus 200 may identify road links of a route for which a travel pace is requested, and communicating those road links to a server, such as map services provider 116 for determination of the travel pace of the respective segments and calculation of the estimated time-of-arrival. The apparatus may include or otherwise be in communication with a processor 202, a memory device 204, a communication interface 206, a user interface 208, and one or more sensors 210. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

The sensors 210 may include sensors such as GNSS sensors, LiDAR sensors, proximity sensors, image sensors, accelerometers, or any such sensors that may facilitate location identification, autonomous vehicle control, or the like. Such sensors 210 may be in communication with one or more processors 202 of the apparatus 200 to provide information regarding a vehicle when the apparatus is embodied as a client or mobile device 114.

Example embodiments of the present disclosure may provide a mechanism for establishing an estimated time-of-arrival at a destination based on the estimated travel time along a route. Embodiments identify a number of positions along the route and determine the pace at those positions. Based on the pace at the positions, a travel time is established from which the estimated time-of-arrival is determined. Embodiments revise the estimate on a regular basis through establishing the travel time along the remaining portion of the route in the same manner that the travel time along the complete route was established. As the travel time is merely an estimate, the calculated travel time is subject to error. Embodiments provided herein employ a method to establish a maximum degree of error to improve the accuracy with which the travel time is estimated, thereby providing an estimated time-of-arrival within a maximum error allowance.

According to an example embodiment provided herein, a mobile device 114, such as a vehicle, personal navigation device, mobile phone, in-vehicle navigation system, or ADAS, for example, may receive an indication of an origin and a destination from which a route may be calculated. Optionally, the mobile device 114 may receive a route from a routing service provider, such as map services provider 116. The route may be established based on a shortest and/or fastest route using a cost function for each road segment between the origin and the destination, with the goal of minimizing the cost function for the shortest/fastest route. The route may be computed based on the road network where segment-traversal costs are computed from real-time and historical traffic patterns to estimate current travel times. In computing the fastest route, the expected traffic speeds along each road segment considered for the route may be used based on real-time data and optionally incorporating historical traffic speed data. In this way the cost function may be used to establish the route with the lowest time cost between the origin and the destination while considering the influence of traffic along each route. Optionally, as described above, embodiments may calculate the lowest cost route, which may coincide with the fastest route. The identified route may be established based, at least in part, on client preferences, such as avoiding tolls, avoiding highways, including High-Occupancy Vehicle (HOV) lanes, etc., as these preferences may impact the route selection.

Once a route is established, an estimated travel time may be calculated using embodiments described herein. The route includes a length given as a sequence of road links. To establish the travel time for the route, identifying the pace along each of the road links of the route may be bandwidth and processing capacity prohibitive as the route may include dozens or hundreds of road links. As such, embodiments described herein provide a method of establishing the travel time that requires less bandwidth and lower processing capacity. Embodiments identify a subset of the road links of the route and establish a pace of travel on the road links of the subset. The pace of travel on the road links of the subset is then used to extrapolate the travel time along the entire route. The greater the number of road links in the subset relative to the total number of road links in the route, the lower the error will be; however, the greater the processing capacity required and bandwidth.

According to an example embodiment, a route is established between an origin and a destination of a length represented as "LENGTH". The pace of a road link is defined as:

$$PACE(S)=1/SPEED(S)$$

Where "SPEED(S)" is the traffic speed at a position S or distance along the route, and where S ranges from 0 to LENGTH. The travel time for the route can be computed by integrating PACE(S):

$$TRAVELTIME = \int_0^{LENGTH} PACE(S) \cdot dS$$

The AVERAGEPACE is the average pace along the entire route given as:

$$AVERAGEPACE = \frac{1}{LENGTH} \int_0^{LENGTH} PACE(S) \cdot dS$$

An understanding of the AVERAGEPACE can be used to compute the travel time as:

$$TRAVELTIME=AVERAGEPACE \cdot LENGTH$$

Thus, rather than knowing the pace (respective speed) of every position along the route, knowing the average pace along the route is sufficient to compute the travel time of the entire route.

Using this methodology, the travel time from the origin of the route to the destination can be established using a lower bandwidth and less processing capacity than other methods of establishing travel time. As described herein, a random sampling of "N" random positions $S_i$ along the route are taken, and the pace is obtained for each of these positions: $x_i=PACE(S_i)$ by identifying the pace at a road link corresponding to each random position. The average pace $\bar{x}$ and its error $s_{\bar{x}}$ can be computed as:

$$\bar{x} = \frac{1}{N} \sum_{i=1}^{N} (x_i - \bar{x})^2$$

$$s = \sqrt{\sum_{i=1}^{N} (x_i - \bar{x})^2}$$

$$s_{\bar{x}} = \frac{s}{\sqrt{N}}$$

The error of pace is proportional to $\sqrt{1/N}$ such that it can be reduced by increasing the number of samples taken along the route. However, as the pace is proportional to the square-root of the amount of samples, to halve the error, the number of samples needs to be increased four-fold. The error $s_{\bar{x}}$ is proportional to s where the less volatile the traffic is along the route, the fewer number of samples are required to estimate the pace within a given error bound. As shown above, a variance for a pace of travel for the road links corresponding to the positions $S_i$ may be divided by a square root of the number of road links in a the subset of road links to obtain an estimated travel time error for the route. Combining the above-described techniques, the travel time and the absolute error can be established as:

$$TRAVELTIME=\bar{x} \cdot LENGTH$$

$$TRAVELTIME\_ERROR=s_{\bar{x}} \cdot LENGTH$$

Given a set of paces from the positions along the length of the route, the amount of samples required for a particular value of error can be established as:

$$SAMPLES(MAXERROR) = \left( \frac{s \cdot LENGTH}{MAXERROR} \right)^2$$

As described above, taking the pace of the road links corresponding to a number of positions along the route can be used to establish an estimated travel time, and thereby compute an estimated time-of-arrival. Further, the error can be controlled using the number of samples to ensure the error is within an absolute maximum. Establishing the pace at different positions along a route, as described herein, includes establishing the pace along a number of road links along the route, where each road link is associated with a position along the route.

According to an example embodiment as described herein, a mobile device 114 identifies a route between an origin and a destination. That route is of a defined length. Based on the acceptable error of the travel time, which may be user configurable at the mobile device, configurable based on parameters at the mobile device, or may be configured by, for example, map services provider 116 having a default acceptable error, a number of positions are identified along the length of the route. Those positions may be randomly identified at the mobile device. Each of the randomly identified positions may be associated with a road link found at the position. The road links associated with the randomly identified positions becomes a subset of road links of all of the road links in the sequence that makes up the route. While the positions (and corresponding road links) may be established based on the length of the route or through some process of selection that is not random, example embodiments may randomly select positions along the route to produce a more random sample of the pace along the route. Further, the distribution of the positions along the route may be spaced out with a minimum distance between positions, or may be entirely random. Further, the mechanism by which positions are selected may vary by road network density along to the route.

The road links in the subset corresponding to the identified positions along the route are sent to a service provider, such as map services provider 116, such that the pace of travel along those road links can be identified. The pace is returned from the service provider for each of the subset of links, and the travel time along the length of the route is calculated. The travel time error is also calculated. A user of the mobile device 114 may then be provided with an estimated time-of-arrival, and potentially, the potential error in the time-of-arrival based on the calculated travel time error.

The subset of road links provided to the service provider may be provided in a number of ways; however, when map versions differ between a mobile device 114 and a service provider such as map services provider 116, road link identifiers may not match. For example, road links may be merged or split to accommodate new intersections or new roads, such that road link identifiers may not be stable between map versions. According to an example embodiment, map information, such as paths of roadways, direction of traffic on said roadways, intersections, and the like may be stored, for example, on a server-side map database 108. As roadway infrastructure is subject to deterioration over time, road construction on existing roadways is an inevitable event that will alter roadways at least temporarily. Further, increases in population and vehicular traffic result in the need for new or expanded roadways, while other roadways may be removed or replaced. The term "roadways," as used herein, may refer to any path a vehicle may take in moving from one place to another. Roadways may be paved, improved roadways, gravel roadways, dirt trails, or the like, such that roadways does not imply that the mapped roads are necessarily recognized as county, state, or federally maintained roads, and may include private roadways such as access roads, neighborhood streets, and the like. As these roadways may change over the course of time, map information related to these roadways may require revision to keep up with the changes to the roadway paths. Additional map update triggers may include changes associated with roadways such as speed limits changing on a road, which may also prompt segmentation of a road link resulting in new road links with new road link identifiers, for example.

The mobile device 114 may identify a subset of road links to the map services provider 116 in order to obtain the pace of travel along those road links. However, client-side map data may not be as up to date as server-side map data. Client-side map data may be map data that is provided with a navigation system or application, and may not receive the periodic updates afforded a server-side map database 108. Consequently, the client map data may not match the server-side map data, and the unique identifiers used to identify road links in the server-side map data may not correspond to unique identifiers of corresponding road links in client map data. Further, roads may change through new construction, through the addition or demolition or roadways, through re-routing of roadways and traffic patterns, or the like. Thus, a route generated by a server-side map service provider 116 may reference road links through unique identifiers that do not correspond to an equivalent route on the client-side map data.

While example embodiments described herein employ the correlation road links between a client and a server for identifying a pace of travel along the respective road links, the correlation of road links between two different systems may be performed for a variety of reasons. For example, a server may communicate information about a geographic region to a client, such as traffic events, road closures, or other factor that may be of interest to a user. In communicating this information, the server may identify a road link along which an event is occurring or for which information is available. The client may have a different map version such that it is important to properly translate the road link identification between map versions. Thus, correlating of road links between map versions can be performed for any of a variety of reasons. Further, while example embodiments described herein may primarily relate to server-side and client-side map versions and conversion, embodiments may be employed between client devices, such as two users communicating between each other to identify a road segment, for example.

A road link may be identified by a client by one or more of a road link identifier (ID), a road name (e.g., state route number, federal highway number, interstate number, etc.), travel direction, functional classification of the road link, longitude and latitude of a mid-point or of end nodes, or the like. Embodiments described herein may provide one or more of these characteristics of a road link in order for the service provider to decipher and to understand the road link to which the mobile device 114 is referencing. In this manner, the client or mobile device 114 may have a map version that is incompatible with a map version of a map services provider 116 while embodiments described herein remain functional.

Embodiments described herein may include an algorithm to estimate a time-of-arrival of a vehicle at a destination and update that estimate periodically. Embodiments may further employ a maximum allowable error for the estimated time-of-arrival to govern aspects of the algorithm. FIG. 3 illustrates an example algorithm to estimate a travel time for a route according to an example embodiment of the present disclosure. The inputs to the algorithm of FIG. 3 include a route (ROUTE) and maximum absolute error (MAXERROR). The outputs of the algorithm include an estimated time-of-arrival (ETA) and error of the estimated time-of-arrival (ETA_ERROR).

As shown in FIG. 3, X is the empty set and N is the number of positions along the route. A loop routine begins with the empty set where M is set equal to N minus the absolute value of the empty set N. With M less than or equal to zero, the loop routine ends as there are sufficient samples along the route. Uniformly at random, M values $S_i$ between zero and the maximum length of the route (LENGTH) are selected. The road links of the route in the subset of road links at the positions $S_i$ are set to $LINK_i$. IDS is introduced as an empty set. For each of the subset of road links $LINK_i$: map-agnostic properties of the $LINK_i$ are retrieved (as described above) to build a map-agnostic identifier $ID_i$ of the road link. A non-exhaustive list of such map-agnostic properties include: a referencing scheme (e.g., OpenLR or Agora-C), a road name (e.g., state route number, federal highway number, interstate number, etc.), travel direction, road link bearing, functional classification of the road link, longitude and latitude of a reference point, a mid-point or of end nodes, or the like. The map-agnostic identifier $ID_i$ is added to the IDS set.

The IDS set is sent from the client (e.g., mobile device 114) to the server (e.g., map services provider 116) as the subset of links for which pace values are requested. The pace values are sent from the server to the client such that the client retrieves the set PACES from the server. The PACES are added to the set X. The travel time error (TRAVELTIME_ERROR) is computed from X using the formula detailed above. From X, the formula from above is used to calculate N=SAMPLES(MAXERROR) which identifies the amount of required samples to reach the given maximum error value. This loop continues until the loop is broken with M being less than or equal to zero, indicating that sufficient road links in the subset have been used to estimate the travel time within the maximum error value. The travel time is then computed as TRAVELTIME from X given the formula detailed above. Based on the travel time and the current time (or an otherwise identified departure time), the estimated time-of-arrival (ETA) is calculated: ETA=departure time+ TRAVELTIME and the error of the estimated time-of-arrival (ETA_ERROR) is set equal to the TRAVELTIME_ERROR.

The algorithm can be performed periodically as a vehicle travels along a route, with the new route updated at each period to be the route to the destination from a current position of the vehicle. The algorithm when performed periodically takes a second subset of the sequence of road links of the remaining route and requests the pace of travel along this second subset to establish an estimated remaining travel time. The estimated remaining travel time may then be communicated to a user, and may be used to compare against the originally identified travel time to establish an accuracy of the original estimated travel time.

Because the process described herein uses only a subset of road links of the route, and as the subset of road links is provided to the server in a map-agnostic form, the process is robust and can be performed without regard for map version disagreement using a low bandwidth and requiring less processing capacity. As described above, the map version agnostic identifiers for a road segment may be provided in a number of different ways, such as including a referencing scheme (e.g., OpenLR or Agora-C), state route number, federal highway number, interstate number, direction of travel, longitude and latitude of a reference point of a road link, road link bearing, roadway functional class, and road name. The algorithm may be performed, for example, every five minutes as long as the user is on the original route. The algorithm may optionally be performed each time a vehicle deviates from the route and a revised route is calculated.

Embodiments provided herein may optionally include a learning component whereby the travel time error that is calculated is adjusted based on actual time-of-arrival at a destination relative to the estimated time-of-arrival at one or more points from along the route. Based on the differences between a time-of-arrival and the one or more estimated times-of-arrival calculated during traversal of the route, the system may increase the number of road links required for a reduction in the error.

While FIG. 3 illustrates the algorithm used by the client to establish a route and request pace values for a subset of road links of the route, FIG. 4 illustrates a server-side processing of the pace values request according to an example embodiment of the present disclosure. As shown in the algorithm of FIG. 4, the server (e.g., map services provider 116) receives a set of map agnostic identifiers $ID_i$ as described above as being generated by the client. The server identifies the corresponding road link $LINK_i$ from the $ID_i$. The speed value or average speed along each respective link is determined, such as by reviewing crowd sourced traffic data, municipal data (e.g., visual/camera measurement), or other sources of vehicle speeds along the links.

This provides a speed $SPEED_i$ for each link $LINK_i$. If there is no known speed value or average speed of traffic along a particular road link, the server may search for road links proximate the particular road link having properties that are similar or the same (e.g., road class, number of lanes, etc.) and point roughly in the same direction. The speed $SPEED_i$ for the particular link becomes the average of the road links proximate the particular link satisfying the similarity criteria within a predetermined degree of similarity. The pace is then computed for each road link as $PACE_i=1/SPEED_i$ for. For each road link in the subset, the corresponding pace $PACE_i$ is then sent to the client for processing. Optionally, the speed along a link may be received by a client whereby the client calculates the pace locally.

FIG. 5 is a flowchart illustrative of methods according to example embodiments of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 5 is a flowchart depicting a method of estimating a travel time along a route by requesting a pace of travel along a subset of road links of the route to a destination and using a received pace of travel along the subset of road links to estimate a time-of-arrival at the destination. As shown in FIG. 5, a route between an origin and a destination including a plurality of sequential road links is obtained at 310. This route may be generated by a mobile device, such as mobile device 114, or generated by a map services provider such as map services provider 116 of FIG. 1. A subset of the plurality of sequential road links may be identified as shown in 320.

This subset may be some number less than all of the road links in the route, where the smaller the subset, the greater the bandwidth and processing capacity savings, though the error may increase with a smaller subset. An identification of each of road link of the subset of road links is provided to a service provider at 330. The service provider may be, for example, map services provider of FIG. 1. An indication is received at 340 of a pace of travel along each of the subset of road links. This indication may be received from the map services provider 116 in response to providing the indication of the road links. An estimated travel time along the route is computed at 350 based on the pace of travel along each of the subset of road links. An estimated time-of-arrival at the destination is provided at 360 based on an identified departure time and the estimated travel time along the route.

In an example embodiment, an apparatus for performing the method of FIG. 5 above may comprise a processor (e.g., the processor 202) configured to perform some or each of the operations (310-360) described above. The processor may, for example, be configured to perform the operations (310-360) by performing hardware implemented logical functions and/or executing stored instructions for performing each of the operations. Alternatively, the apparatus may comprise means for performing each of the operations described above. In this regard, according to an example embodiment, examples of means for performing operations 310-360 may comprise, for example, the processor 202 and/or a device or circuit for executing instructions for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus onboard a vehicle comprising at least one processor and at least one memory including computer program code, the at least one memory and computer program code configured to, with the at least one processor, cause the apparatus to at least:

obtain a route between an origin and a destination, wherein the route comprises a plurality of sequential road links;

identify a subset of road links of the plurality of sequential road links;

transmit via a wireless interface of the apparatus a request to a service provider for an indication of a pace of travel along each of the subset of road links;

receive an indication of a pace of travel along each of the subset of road links;

compute an estimated travel time along the route based on the pace of travel along each of the subset of road links;

compute an estimated travel time error along the route, wherein the estimated travel time error is calculated based, at least in part, on a number of road links in the subset of road links;

provide an estimated time-of-arrival at the destination based on an identified departure time and the estimated travel time along the route, and the estimated travel time error as a potential error of the estimated time-of-arrival at the destination;

provide for presentation of the route and the estimated time-of-arrival at the destination on a display of a user device interface associated with an autonomous vehicle; and cause the autonomous vehicle to travel along the route.

2. The apparatus of claim 1, wherein causing the apparatus to compute an estimated travel time error along the route comprises causing the apparatus to:

determine a variance of the pace of travel for the subset of road links; and divide the variance of the pace of travel by a square root of a number of road links in the subset of road links to obtain the estimated travel time error along the route.

3. The apparatus of claim 1, wherein the subset of road links of the plurality of sequential road links is a first subset of road links, and wherein in response to the estimated travel time error along the route being greater than a predefined maximum error, causing the apparatus to further:

identify a second subset of road links of the plurality of sequential road links, wherein the second subset of road links comprises more road links than the first subset of road links;

provide an identification of each road link of the second subset of road links to the service provider;

receive an indication of a pace of travel along each of the second subset of road links; and compute a new estimated travel time error along the route from the second subset of road links, wherein causing the apparatus to provide the estimated time-of-arrival at the destination based on the identified departure time and the estimated travel time along the route comprises causing the apparatus to:

provide the estimated time-of-arrival at the destination based on the identified departure time and the estimated travel time along the route in response to the new estimated travel time error along the route from the second subset of road links being below the predefined maximum error.

4. The apparatus of claim 1, wherein causing the apparatus to identify the subset of road links of the plurality of sequential road links comprises causing the apparatus to:

select a predefined number of positions along the route; and identify road links associated with each of the predefined number of positions along the route, wherein the road links associated with the predefined number of positions along the route comprises the subset of road links of the plurality of sequential road links.

5. The apparatus of claim 1, wherein the apparatus is further caused to:

identify a new subset of road links from remaining sequential road links of the route periodically as the route is traversed, wherein remaining sequential road links are road links of the route not yet traversed;

provide an identification of each road link of the new subset of road links to the service provider;

receive an indication of a pace of travel along each of the new subset of road links;

compute a revised estimated travel time along the route based on the pace of travel along each of the new subset of road links; and provide a revised estimated time-of-arrival at the destination based on the revised estimated travel time along the route.

6. A computer program product comprising at least one non-transitory computer-readable storage medium having computer-executable program code portions stored therein, the computer-executable program code portions comprising program code instructions configured to:

obtain a route between an origin and a destination, wherein the route comprises a plurality of sequential road links;

identify a subset of road links of the plurality of sequential road links;

transmit via a wireless interface a request to a service provider for an indication of a pace of travel along each of the subset of road links;

receive an indication of a pace of travel along each of the subset of road links;

compute an estimated travel time along the route based on the pace of travel along each of the subset of road links;

compute an estimated travel time error along the route, wherein the estimated travel time error is calculated based, at least in part, on a number of road links in the subset of road links;

provide an estimated time-of-arrival at the destination based on an identified departure time and the estimated travel time along the route, and the estimated travel time error as a potential error of the estimated time-of-arrival at the destination;

provide for presentation of the route and the estimated time-of-arrival at the destination on a display of a user device interface associated with an autonomous vehicle; and cause the autonomous vehicle to travel along the route.

7. The computer program product of claim 6, wherein the program code instructions to compute the estimated travel time error along the route comprise program code instructions to:

determine a variance of the pace of travel for the subset of road links; and divide the variance of the pace of travel by a square root of a number of road links in the subset of road links to obtain the estimated travel time error along the route.

8. The computer program product of claim 6, wherein the subset of road links of the plurality of sequential road links is a first subset of road links, and wherein in response to the estimated travel time error along the route being greater than a predefined maximum error, the computer program product comprises program code instructions to:

identify a second subset of road links of the plurality of sequential road links, wherein the second subset of road links comprises more road links than the first subset of road links:

provide an identification of each road link of the second subset of road links to the service provider;

receive an indication of a pace of travel along each of the second subset of road links; and compute a new estimated travel time error along the route from the second subset of road links, wherein the program code instructions to provide the estimated time-of-arrival at the destination based on the identified departure time and the estimated travel time along the route comprise program code instructions to:

provide the estimated time-of-arrival at the destination based on the identified departure time and the estimated travel time along the route in response to the new estimated travel time error along the route from the second subset of road links being below the predefined maximum error.

9. The computer program product of claim 6, wherein the program code instructions to identify the subset of road links of the plurality of sequential road links comprise program code instructions to:

select a predefined number of positions along the route; and identify road links associated with each of the predefined number of positions along the route, wherein the road links associated with the predefined number of positions along the route comprises the subset of road links of the plurality of sequential road links.

10. The computer program product of claim 6, further comprising program code instructions to:

identify a new subset of road links from remaining sequential road links of the route periodically as the route is traversed, wherein remaining sequential road links are road links of the route not yet traversed;

provide an identification of each road link of the new subset of road links to the service provider;

receive an indication of a pace of travel along each of the new subset of road links;

compute a revised estimated travel time along the route based on the pace of travel along each of the new subset of road links; and provide a revised estimated time-of-arrival at the destination based on the revised estimated travel time along the route.

11. A method comprising:

obtaining a route between an origin and a destination, wherein the route comprises a plurality of sequential road links;

identifying a subset of road links of the plurality of sequential road links;

transmitting via a wireless interface a request to a service provider for an indication of a pace of travel along each of the subset of road links;

receiving an indication of a pace of travel along each of the subset of road links;

computing an estimated travel time along the route based on the pace of travel along each of the subset of road links;

computing an estimated travel time error along the route, wherein the estimated travel time error is calculated based, at least in part, on a number of road links in the subset of road links;

providing an estimated time-of-arrival at the destination based on an identified departure time and the estimated travel time along the route, and the estimated travel time error as a potential error of the estimated time-of-arrival at the destination;

providing for presentation of the route and the estimated time-of-arrival at the destination on a display of a user device interface associated with an autonomous vehicle; and causing the autonomous vehicle to travel along the route.

12. The method of claim 11, wherein computing an estimated travel time error along the route comprises:

determining a variance of the pace of travel for the subset of road links; and dividing the variance of the pace of travel by a square root of a number of road links in the subset of road links to obtain the estimated travel time error along the route.

13. The method of claim 11, wherein the subset of road links of the plurality of sequential road links is a first subset of road links, and wherein in response to the estimated travel time error along the route being greater than a predefined maximum error, the method further comprises:

identifying a second subset of road links of the plurality of sequential road links, wherein the second subset of road links comprises more road links than the first subset of road links;

providing an identification of each road link of the second subset of road links to the service provider;

receiving an indication of a pace of travel along each of the second subset of road links; and computing an estimated travel time error along the route from the second subset of road links;

wherein providing the estimated time-of-arrival at the destination based on the identified departure time and the estimated travel time along the route comprises:

providing the estimated time-of-arrival at the destination based on the identified departure time and the estimated travel time along the route in response to the estimated travel time error along the route from the second subset of road links being below the predefined maximum error.

14. The apparatus of claim 1, wherein in response to real-time traffic information being unavailable for a given road link, the service provider determines average pace of the given road link using a road link proximate the given road link and having properties in common with the given road link.

15. The computer program product of claim 6, wherein in response to real-time traffic information being unavailable for a given road link, the service provider determines average pace of the given road link using a road link proximate the given road link and having properties in common with the given road link.

16. The method of claim 11, wherein in response to real-time traffic information being unavailable for a given road link, the service provider determines average pace of the given road link using a road link proximate the given road link and having properties in common with the given road link.

17. The apparatus of claim 1, wherein the apparatus is further caused to provide for autonomous vehicle control along the route.

18. The computer program product of claim 6, further comprising program code instructions to provide for autonomous vehicle control along the route.

19. The method of claim 11, further comprising providing for autonomous vehicle control along the route.

\* \* \* \* \*